UNITED STATES PATENT OFFICE.

CHARLES L. FOWLER, OF BALTIMORE, MARYLAND.

IMPROVEMENT IN ROOFING COMPOUNDS.

Specification forming part of Letters Patent No. 118,850, dated September 12, 1871.

*To all whom it may concern:*

Be it known that I, CHARLES L. FOWLER, of Baltimore city, in the State of Maryland, have invented a new and useful Roofing Compound, composed of the following articles and ingredients in the proportions named—that is to say: Four and one-half bushels of dry sifted sand, three bushels of dry pulverized clay, one bushel of dry sifted air-slaked lime, fifteen pounds of cattle-hair, five pounds of sifted magnesia, five pounds of pulverized sulphur, forty-five gallons of composition made from gas-tar, ten pounds of asbestos fiber, and three bushels of pulverized charcoal; and I do hereby declare that the following is a full, clear, and exact description of the said roofing-compound, and of the manner and mode of making the same, to wit:

Dissolve the composition, and after the same is thoroughly melted, and when at a moderate heat, the compound of sand, clay, lime, magnesia, sulphur, and charcoal, after being thoroughly mixed, is to be added, by sifting into the composition gradually, and by a steady stirring of the whole during the process. After the above ingredients are in and thoroughly dissolved then the cattle-hair, or the hair of any animal, and the fiber of asbestos are to be added, by sprinkling over the surface of the above compound. A continued stirring of the whole is to be kept up until the respective quantity of fiber and hair are in, taking sufficient time in adding the fiber and hair, so as not to allow the compound to clod or congeal in lumps. After the ingredients are all in, a continued process of dipping is to be kept up for at least one hour, after which the mass shall be allowed to cook from two to four hours over a slow fire. To ascertain when the mixture is sufficiently cooked, take a small quantity from the kettle and spread it on a piece of felt; sprinkle it with clean sand while hot, then place it to cool. When cooled thoroughly, if it is found flexible, and the edges are not gummy or sticky, and the surface does not crack by bending, it is ready to take out and fit for use. The sand is to give the compound body or granite foundation; the clay, to give it toughness and elastic strength; the sulphur, to harden it; the magnesia, to give it fine texture; the charcoal, to assist in absorbing the vaporizing qualities of the composition; the lime is used as a retaining power in extreme cold weather, and the asbestus to make it thoroughly fire-proof. The relative proportions of the ingredients may be changed somewhat, but the proportions given above are those that I have established from actual experience as giving the best results, and one inexperienced should follow the formula to the letter. By these means I obtain a roofing-compound quite free from brittleness, of great endurance and strength, and which will stand the heat and cold of any climate and not be affected thereby.

Having thus described my invention, what I claim as new, and desire to secure by Letters Patent, is—

A roofing-compound, composed of the foregoing ingredients in about the proportions named and mentioned, and to be called and known by the name and style of "Fowler's Egyptian Roofing."

Signed by me this 4th day of August, 1871.

CHARLES L. FOWLER.

Witnesses:
SAML. WITHERUE,
S. C. LONG.                             (92.